Figure 1:
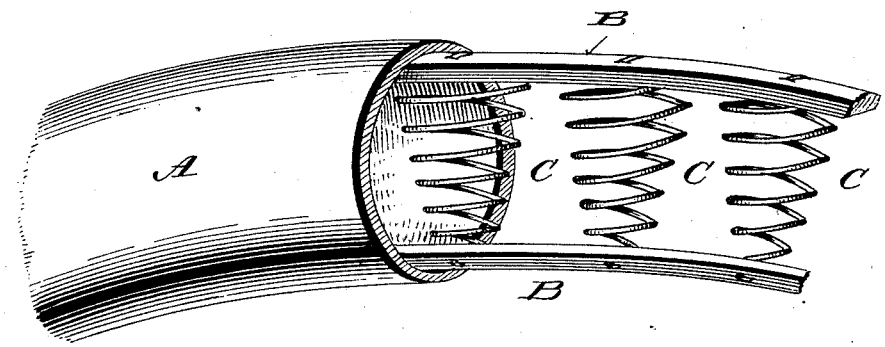

(No Model.)

C. J. SPOFFORD.
BICYCLE TIRE.

No. 519,976. Patented May 15, 1894.

Witnesses:
L. C. Hills.
A. L. Hough.

Inventor:
Carlton J. Spofford
by Franklin H. Hough
Atty.

THE NATIONAL LITHOGRAPHING COMPANY,
WASHINGTON, D. C.

UNITED STATES PATENT OFFICE.

CARLTON J. SPOFFORD, OF DOLGEVILLE, NEW YORK.

BICYCLE-TIRE.

SPECIFICATION forming part of Letters Patent No. 519,976, dated May 15, 1894.

Application filed February 19, 1894. Serial No. 500,787. (No model.)

*To all whom it may concern:*

Be it known that I, CARLTON J. SPOFFORD, a citizen of the United States, residing at Dolgeville, in the county of Herkimer and State of New York, have invented certain new and useful Improvements in Bicycle-Tires; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in bicycle tires, and it has particular reference to that class of tires in which the tire consists of a hollow tube of rubber or other flexible material, within which are seated spiral springs.

A serious objection to the use of the so called "pneumatic tires," is due to the fact that when the tire is accidentally punctured the air escapes, thus rendering the tire useless until repaired. As a substitute for the pneumatic tire various forms of tire have been proposed, and in some instances tires have been produced in which spiral springs have been placed within pockets arranged at intervals of the length of the tire. These tires have however been found objectionable, owing to the fact that in case any of the several springs employed should at any time be broken or should loose their tension, no suitable provision has been devised for their ready removal or replacement. Another and more serious objection to the use of springs within hollow tires, has been due to the fact that with springs arranged at intervals of the length of the tire, and separated by partitions, or by intervening spaces, the surface of the tire soon becomes uneven, owing to the bunching of the tire at the points at which the springs are placed.

The essential object of my present invention is to provide a hollow pliable tire with a series of spiral springs, the several springs being placed in close contact and having their ends attached to strips of leather or other material adapted to the purpose; the springs being so attached as to admit of their ready removal or replacement when desired.

To these ends and to such others as the invention may pertain, the same consists in the peculiar construction and in the novel arrangement, combination and adaptation of parts, all as more fully hereinafter described, shown in the accompanying drawings, and then specifically defined in the appended claim.

The invention is fully illustrated in the accompanying drawings, which, with the letters of reference marked thereon, form a part of this specification, like letters of reference indicating the same parts throughout the several views, and in which drawings—

Figure 2:
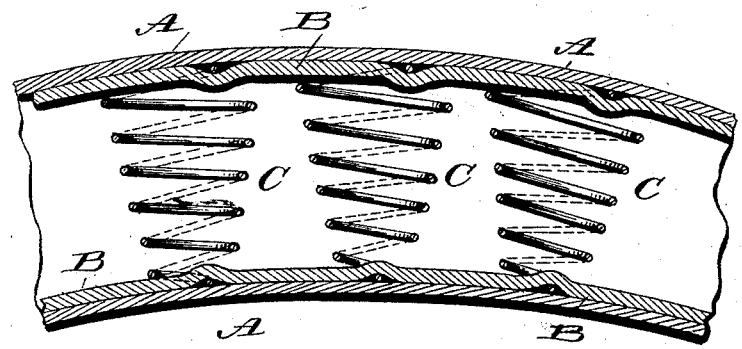
Figure 3:
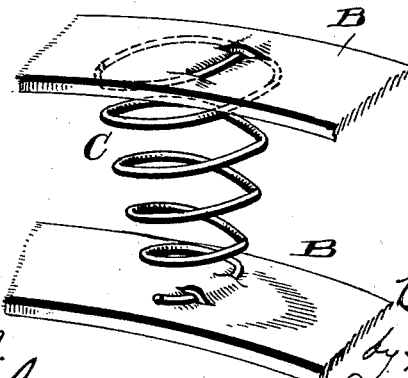

Figure 1 is a perspective view of a series of springs secured between the leather strips, in accordance with my invention, the same being shown as withdrawn from a section of the hollow tube or tire. Fig. 2 is a longitudinal section through a portion of the tire, with the springs in place. Fig. 3 is an enlarged detail in perspective, which will be more particularly hereinafter referred to.

Reference now being had to the details of the drawings by letter A designates a hollow rubber tube, such as is commonly employed for the pneumatic tires of bicyles.

B, B are strips of leather or other material adapted to the purpose, and C, C are short and substantial springs, spiral in form which are arranged in a continuous series between the straps, and are either placed in contact with one another, or but slightly separated. These springs may be attached to the straps in any suitable manner, but preferably by having the ends of the springs inserted in openings in the straps, as shown in Fig. 3 of the drawings, as this means of attachment will admit of the ready placement of, and removal of the springs from the straps, when desired.

The outer face of the strap which is designed to contact with the outer face, or tread of the tire, should be oval or rounding, so as to conform as nearly as possible to the curvature of the tube or tire.

The springs having been attached to the straps, as described, the straps, with the springs in place between them are drawn into the tire, and the ends of the tire are drawn together and attached in any suitable manner.

Having thus described my invention, what I claim to be new, and desire to secure by Letters Patent, is—

In a bicycle tire of the character described, in combination with a hollow flexible tube, of a series of spiral springs arranged in a continuous series, each spring being in contact with or in close proximity to the next adjacent spring in the series, straps connecting the springs at their upper and lower ends and adapted to be drawn within the hollow tube, substantially as described and for the purpose specified.

In testimony whereof I affix my signature in presence of two witnesses.

CARLTON J. SPOFFORD.

Witnesses:
W. R. GRACE,
JOHN P. JONES.